«Patented Nov. 15, 1949»

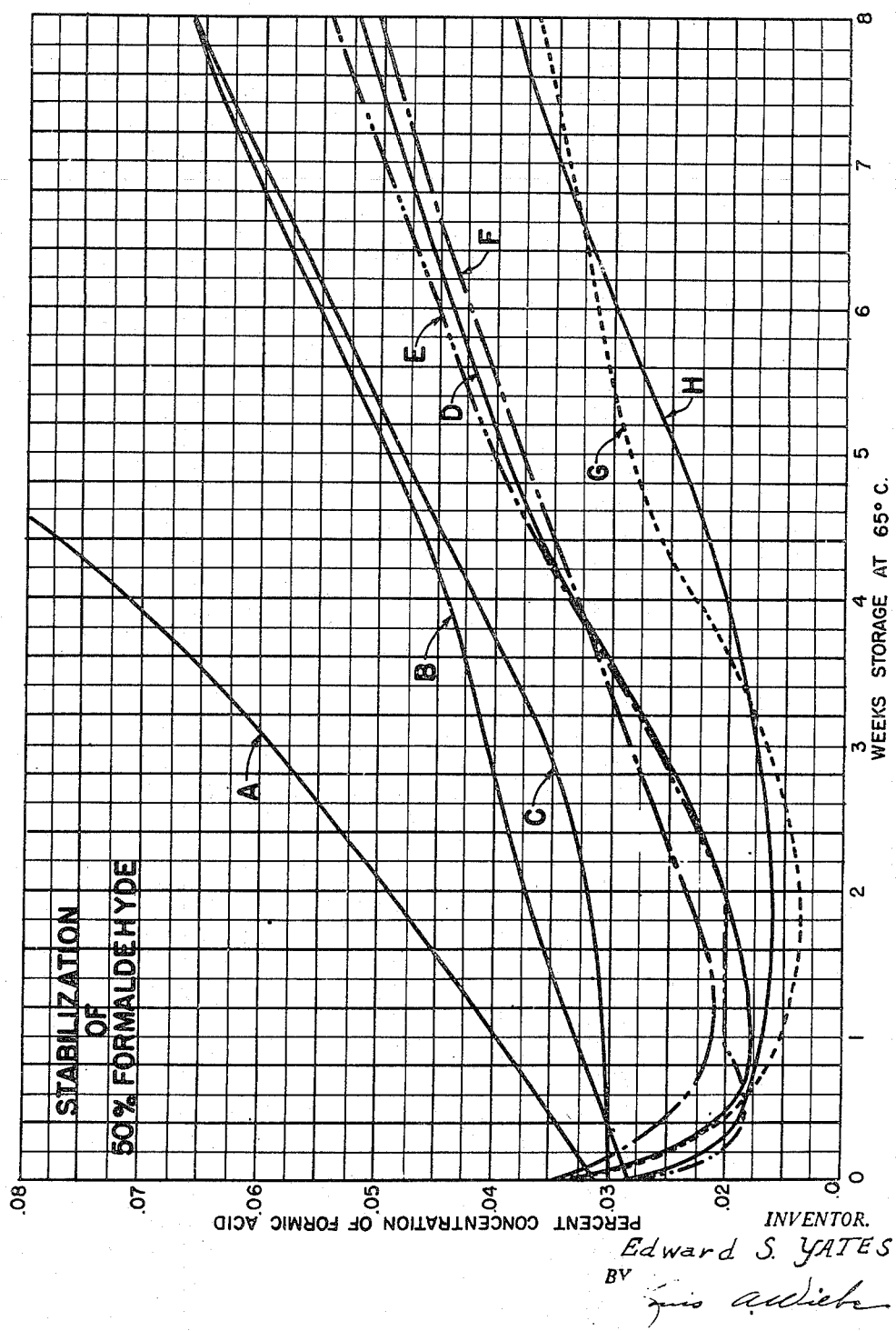

UNITED STATES PATENT OFFICE 2,488,363

STABILIZATION OF FORMALDEHYDE

Edward S. Yates, Fultonville, N. Y., assignor to E. I. du Pont de Nemours & Company, Wilmington, Del., a corporation of Delaware Application August 1, 1946, Serial No. 687,614

10 Claims. (Cl. 260—606)

This invention relates to the stabilization of formaldehyde against acid formation and, more particularly, it relates to the treatment of an aqueous solution of formaldehyde to reduce oxidation to formic acid.

Aqueous solutions of formaldehyde, particularly such solutions containing between 30% and 95% formaldehyde, gradually lose strength and increase in acidity during storage. The mechanism of such acid formation is not entirely understood, but is probably due in large part to the Cannizzaro reaction, i. e., the autoxidation reaction of formaldehyde with itself and water to form, by oxidation, formic acid and to form, by reduction, methanol. The formaldehyde is also subject to oxidation to formic acid by oxygen present in the solution.

The above-mentioned reactions which gradually take place in formaldehyde solutions are probably enhanced and catalyzed by the presence of iron and aluminum, which metals are contained in aqueous solutions of formaldehyde as a result of contact with iron and aluminum apparatus used in the manufacture thereof, or minute amounts of such metals may be contained in the water used in the production of the formaldehyde solution.

Acid formation is usually inappreciable for ordinary storage periods at room temperature, but increases rapidly with increase in temperature. This makes acid formation particularly troublesome for solutions of 37% to 60% concentration which contain little or no methanol and must be kept at elevated temperatures to prevent precipitation of polymer. Methanol acts as a stabilizer against polymer precipitation.

The quantity of formic acid in aqueous formaldehyde is very small, even when such solutions have been subjected to extended periods of storage. The utility of formaldehyde for certain uses is, however, dependent upon maintaining the formic acid content exceedingly low, for example, less than 0.05%. The stabilization of formaldehyde against formic acid formation has been troublesome and constitutes a problem which has been of considerable concern for years.

It is an object of this invention to produce aqueous solutions of formaldehyde that have an increased stability against acid formation when stored over a period of time.

It is another object of this invention to produce aqueous solutions of formaldehyde that have an increased stability against acid formation when stored over a period of time and maintained at an elevated temperature to prevent polymer precipitation.

It is still another object of this invention to produce aqueous solutions of formaldehyde containing a substance or substances which will greatly retard loss of strength and formation of formic acid.

It is a still further object of this invention to provide a process for the treatment of aqueous solutions of formaldehyde whereby to increase the stability thereof and retard loss of strength and the formation of formic acid therein.

Other objects of the invention will appear hereinafter.

The objects of this invention may be accomplished, in general, by adding to an aqueous solution of formaldehyde containing between 30% and 95% by weight of formaldehyde, a compound taken from the group consisting of phosphoric acid and water-soluble phosphates. Although it is not essential, it is preferred also to add an amine taken from the group consisting of primary aliphatic amines and hydroxy alkyl amines containing not to exceed four carbon atoms and hexamethylenetetramine to the aqueous formaldehyde solution.

As above indicated, the invention is particularly applicable to aqueous formaldehyde solutions containing between 30% and 95% by weight of formaldehyde. Formaldehyde solutions of less than 30% strength usually do not have an objectionable acidity and need not be stored at elevated temperatures.

The phosphoric acid or phosphate is usually added in very small amount to avoid undue adulteration. The desired effect of retarding acid formation or other reaction of the formaldehyde will be accomplished by the addition of 0.0001% to 0.1% of phosphoric acid or phosphate by weight of formaldehyde solution, with a preferred concentration of the order of 0.002%. Larger amounts than 0.1% can, however, be used, particularly where adulteration is of little or no consequence. The phosphoric acid or phosphate appears to stop or retard the gradual formation of formic acid in the formaldehyde solutions.

As examples of suitable phosphates for use in the manner above described, the following may be named: phosphoric acid; alkali metal phosphates, for example sodium or potassium phosphates; alkali metal pyrophosphates, for example sodium or potassium pyrophosphates; alkali metal hexametaphosphates, for example sodium or potassium hexametaphosphates; alkyl phosphates, for example mono- and di-butyl phosphates. Any phosphates having a solubility in water of at least 0.0001% will have the stabilizing effect referred to above. From a standpoint of efficiency, phosphoric acid and sodium or potassium pyrophosphates are greatly preferred.

In order to obtain a still greater stabilizing effect it is preferred also to add to the aqueous formaldehyde a quantity of an amine taken from the group consisting of primary aliphatic amines and hydroxy alkylamines containing not to exceed four carbon atoms and hexamine (hexamethylenetetramine). As examples of primary aliphatic amines and hydroxy alkyl amines of not to exceed four carbon atoms, the following may be named: ethylene diamine, methylamine, ethylamine, propylamine, butylamine, hydroxy methyl amine, hydroxy ethyl amine, and hydroxy butyl amine. The primary aliphatic amines and hydroxy alkylamines are believed to react, in situ, with formaldehyde to produce cyclic methylene amines. Hexamine has a useful neutralizing effect on formic acid which is of value apart from its stabilizing action, and accounts for decreases in acidity of formaldehyde solutions on storage. The hexamine also appears to form a complex with the iron or aluminum which may be present in the solution. In order to prevent undue adulteration, the said amines are also preferably added in very small amounts, for example, between 0.005% and 0.05%, based on the weight of the solution, with a preferred concentration of 0.01% to 0.02%. Again, where adulteration is of very little significance, these amines can be added in much larger amounts. The hexamine need not be added as such but may be formed, in situ, in the formaldehyde solution, for example by the addition of ammonia or ammonium hydroxide to the formaldehyde. The ammonia will react with formaldehyde to form the hexamine. The term "hexamine" or its equivalent "hexamethylenetetramine" as used throughout the specification and claims is meant to include the presence of this substance whether added as such or formed, in situ, in the solution.

The phosphoric acid or phosphate, and if also used the amine, may be added to the formaldehyde solution before, during, or after the production of the formaldehyde solution. Preferably, these materials are added to the scrubber water used in absorbing the formaldehyde during the production thereof.

The accompanying drawing shows, in graphic form, the effect of adding varying percentages of sodium pyrophosphate, hexamethylenetetramine, and a combination of both of these materials to a 50% aqueous solution of formaldehyde on the formic acid content of the solution.

Referring to the graphic chart:

Line A shows the gradual increase of formic acid content of a 50% aqueous solution of formaldehyde during several weeks storage. This represents a control in which nothing was added to the formaldehyde solution.

Line B shows the greatly retarded increase in formic acid content in a similar solution containing 0.007% by weight of sodium pyrophosphate.

Line C shows the retarded increase in formic acid content in a like solution containing 0.002% by weight of sodium pyrophosphate.

Line D shows the retarded increase in formic acid content in a like solution containing 0.02% by weight of hexamethylenetetramine added as such.

Line E shows the retarded increase in formic acid content in a like solution containing 0.02% by weight of hexamethylenetetramine formed, in situ, by addition of ammonium hydroxide.

Line F shows the retarded increase in formic acid content in a like solution containing 0.01% by weight of hexamethylenetetramine plus 0.007% by weight of sodium pyrophosphate.

Line G shows the retarded increase in formic acid content in a like solution containing 0.02% by weight of hexamethylenetetramine plus 0.002% by weight of sodium pyrophosphate.

Line H shows the retarded increase in formic acid content in a like solution containing 0.02% by weight of hexamethylenetetramine, formed in situ by addition of ammonium hydroxide, and 0.002% by weight of sodium pyrophosphate.

From a study of the lines of the graphic chart, it clearly appears that the addition of a phosphate together with hexamethylenetetramine has a synergistic effect, i. e., the addition of the two materials together imparts a greater stabilization against formic acid formation than the additive effect of the two materials.

The following detailed examples are given to illustrate certain preferred methods of treating formaldehyde solutions in accordance with the present invention, it being understood that the invention is not to be limited to the details set forth therein.

EXAMPLE I

A freshly prepared aqueous solution of formaldehyde containing about 50% by weight of formaldehyde was divided into six substantially equal parts. To five of these parts were added, respectively, (1) 0.001% by weight of sodium pyrophosphate
(2) 0.002% by weight of sodium pyrophosphate
(3) 0.003% by weight of sodium pyrophosphate
(4) 0.005% by weight of sodium pyrophosphate
(5) 0.02% by weight of hexamine plus 0.002% by weight of sodium pyrophosphate.

To the sixth part, which was run as a control, nothing was added. The formic acid contents, in per cent by weight, were determined in the six samples at the initiation of the test and after two weeks storage, four weeks storage, and six weeks storage, with the following tabulated results.

| Sample No. | Per Cent Formic Acid Content ||||
|---|---|---|---|---|
| | Initial | 2 Weeks | 4 Weeks | 6 Weeks |
| 1 | .030 | .042 | .052 | .061 |
| 2 | .029 | .042 | .050 | .062 |
| 3 | .028 | .040 | .052 | .061 |
| 4 | .028 | .040 | .048 | .056 |
| 5 | .029 | .012 | .021 | .030 |
| 6[1] | .030 | .045 | .063 | .071 |

[1] Control.

The following table discloses the stabilizing effect of hexamine and certain phosphates when used alone or in combination with each other on 50% formaldehyde solutions stored for six weeks at 65° C., in comparison with controls in which no stabilizing agent is employed. The tabulated results obtained by use of hexamine in combination with the phosphates clearly shows a synergistic effect.

Table I

| Stabilizers | | Per Cent Acid | | |
|---|---|---|---|---|
| Per Cent Conc. | Name | Start | 6 Weeks | Diff. |
| CONTROL TESTS | | | | |
| None | | 0.037 | 0.092 | 0.055 |
| None | | 0.030 | 0.071 | 0.041 |
| None | | 0.028 | 0.082 | 0.054 |
| None | | 0.035 | 0.087 | 0.052 |
| None | | 0.019 | 0.110 | 0.091 |
| None | | 0.037 | 0.088 | 0.051 |
| HEXAMINE | | | | |
| 0.015 | Hexamine | 0.036 | 0.075 | 0.029 |
| 0.020 | do | 0.035 | 0.064 | 0.029 |
| 0.020 | do | 0.031 | 0.052 | 0.021 |
| 0.020 | do | 0.034 | 0.044 | 0.010 |
| 0.020 | do | 0.036 | 0.030 | −0.006 |
| 0.020 | Hexamine (formed in situ by addition of NH₃) | 0.028 | 0.045 | 0.017 |
| 0.025 | Hexamine | 0.036 | 0.060 | 0.024 |
| 0.025 | do | 0.027 | 0.045 | 0.018 |
| PHOSPHATES | | | | |
| 0.001 | Sod. Pyrophosphate | 0.030 | 0.061 | 0.031 |
| 0.002 | do | 0.029 | 0.062 | 0.033 |
| 0.002 | do | 0.030 | 0.053 | 0.023 |
| 0.003 | do | 0.028 | 0.061 | 0.033 |
| 0.005 | do | 0.028 | 0.056 | 0.028 |
| 0.007 | do | 0.028 | 0.053 | 0.025 |
| 0.002 | 50-50 Mixture of Mono- and Dibutyl Phosphates | 0.037 | 0.080 | 0.043 |
| 0.020 | Sodium Hexametaphosphate | 0.047 | 0.096 | 0.049 |
| HEXAMINE AND PHOSPHATES | | | | |
| 0.020 / 0.002 | Hexamine / Sod. Pyrophosphate | 0.029 | 0.030 | 0.001 |
| 0.020 / 0.002 | Hexamine / Sod. Pyrophosphate | 0.034 | 0.031 | −0.003 |
| 0.020 / 0.002 | Hexamine / Sod. Pyrophosphate | 0.036 | 0.030 | −0.006 |
| 0.020 / 0.002 | Hexamine-NH₃ equiv. / Sod. Pyrophosphate | 0.030 | 0.029 | −0.001 |
| 0.020 / 0.007 | Hexamine / Sod. Pyrophosphate | 0.033 | 0.029 | −0.004 |
| 0.010 / 0.007 | Hexamine / Sod. Pyrophosphate | 0.033 | 0.042 | 0.009 |
| 0.020 / 0.002 | Hexamine / Phosphoric acid | 0.038 | 0.030 | −0.008 |
| 0.020 / 0.002 | Hexamine / 50-50 Mixture of Mono- and Dibutyl Phosphates | 0.035 | 0.032 | −0.003 |

Table II, below, shows in tabulated form the stabilization against formic acid formation in a 50% formaldehyde solution after six weeks storage by the use of ethylene diamine, a primary aliphatic amine, and the stabilization effect of a combination of this amine with sodium pyrophosphate in comparison with a combination of sodium pyrophosphate with diethylamine, a secondary amine, and trimethylamine, a tertiary amine. These results show that secondary and tertiary amines are relatively ineffective in comparison with primary aliphatic amines.

Table II

| Stabilizers | | Per Cent Acid | | |
|---|---|---|---|---|
| Per Cent Conc. | Name | Start | 6 Weeks | Diff. |
| AMINES OTHER THAN HEXAMINE | | | | |
| 0.017 | Ethylene Diamine | 0.035 | 0.064 | 0.029 |
| PYROPHOSPHATE AND MISC. AMINES | | | | |
| 0.010 / 0.002 | Trimethylamine / Sod. Pyrophosphate | 0.031 | 0.050 | 0.019 |
| 0.010 / 0.002 | Diethylamine / Sod. Pyrophosphate | 0.030 | 0.047 | 0.017 |
| 0.017 / 0.002 | Ethylene Diamine / Sod. Pyrophosphate | 0.035 | 0.033 | −0.002 |

The following table shows the effect of a combination of sodium pyrophosphate and hexamine on a 50% formaldehyde solution after storage for six weeks at 65° C. in the presence of stainless steel. A control in which no stabilizer was used is shown for comparison.

Table III

| Stabilizers | | Per Cent Acid | | |
|---|---|---|---|---|
| Per cent Conc. | Name | Start | 6 Weeks | Diff. |
| None | | 0.036 | 0.332 | 0.296 |
| 0.015 / 0.002 | Hexamine / Sod. Pyrophosphate | 0.035 | 0.046 | 0.011 |
| 0.020 / 0.002 | Hexamine / Sod. Pyrophosphate | 0.035 | 0.045 | 0.010 |
| 0.015 / 0.007 | Hexamine / Sod. Pyrophospate | 0.035 | 0.039 | 0.004 |

The next following table shows the stabilizing effect of sodium pyrophosphate against formic acid formation in a formaldehyde solution of between 80% and 90% strength stored for twenty-four hours at 120° C. and 130° C.

Table IV

| Form. Conc. in per cent | Stabilizer per cent Conc. | Name | Acidity | | | Loss of Form. in per cent |
|---|---|---|---|---|---|---|
| | | | Start | 24 Hrs. | Diff. | |
| 87.9 | None | | 0.02 | 0.66 | 0.64 | 3.3 |
| 87.9 | None | | 0.02 | 0.85 | 0.83 | 3.4 |
| 87.9 | None | | 0.02 | 0.60 | 0.58 | 6.3 |
| 89.5 | 0.01 | Sod. Pyrophosphate | 0.04 | 0.29 | 0.25 | 1.7 |
| 89.5 | 0.01 | do | 0.04 | 0.29 | 0.25 | 1.5 |
| 89.5 | 0.01 | do | 0.04 | 0.24 | 0.20 | 1.4 |

Reference in the specification and claims to parts, proportions and percentages, unless otherwise specified, refers to parts, proportions and percentages by weight.

Since it is obvious that many changes and modifications can be made in the above-described details without departing from the nature and spirit of the invention, it is to be understood that the invention is not to be limited to said details except as set forth in the appended claims.

What is claimed is:

1. The process of stabilizing an aqueous solution of formaldehyde containing between 30% and 95% by weight of formaldehyde which comprises adding to said solution between 0.0001% and 0.1% of a compound taken from the group consisting of phosphoric acid and water-soluble phosphates.

2. The process of stabilizing an aqueous solution of formaldehyde containing between 30% and 95% by weight of formaldehyde which comprises adding to said solution between 0.0001% and 0.1% of sodium pyrophosphate.

3. The process of stabilizing an aqueous solution of formaldehyde containing between 30% and 95% by weight of formaldehyde which comprises adding to said solution between 0.0001% and 0.1% of phosphoric acid.

4. The process of stabilizing an aqueous solution of formaldehyde containing between 30% and 95% by weight of formaldehyde which comprises adding to said solution between 0.005% and 0.05% of an amine taken from the group consisting of primary aliphatic amines and hydroxy alkyl amines containing not to exceed four carbon atoms and hexamethylenetetramine and between 0.0001% and 0.1% of a compound taken from the group consisting of phosphoric acid and water-soluble phosphates.

5. The process of stabilizing an aqueous solution of formaldehyde containing between 30% and 95% by weight of formaldehyde which comprises adding to said solution between 0.005% and 0.05% of hexamethylenetetramine and between 0.0001% and 0.1% of a compound taken from the group consisting of phosphoric acid and water-soluble phosphates.

6. An aqueous solution of formaldehyde containing between 30% and 95% by weight of formaldehyde stabilized by the addition thereto of 0.0001% to 0.1% of a compound taken from the group consisting of phosphoric acid and water-soluble phosphates.

7. An aqueous solution of formaldehyde containing between 30% and 95% by weight of formaldehyde stabilized by the addition thereto of 0.0001% to 0.1% of sodium pyrophosphate.

8. An aqueous solution of formaldehyde containing between 30% and 95% by weight of formaldehyde stabilized by the addition thereto of 0.0001% to 0.1% of phosphoric acid.

9. An aqueous solution of formaldehyde containing between 30% and 95% by weight of formaldehyde stabilized by the addition thereto of 0.005% and 0.05% of an amine taken from the group consisting of primary aliphatic amines and hydroxy alkyl amines containing not to exceed four carbon atoms and hexamethylenetetramine and 0.0001% to 0.1% of a compound taken from the group consisting of phosphoric acid and water-soluble phosphates.

10. An aqueous solution of formaldehyde containing between 30% and 95% by weight of formaldehyde stabilized by the addition thereto of 0.005% and 0.05% of hexamethylenetetramine and 0.0001% to 0.1% of a compound taken from the group consisting of phosphoric acid and water-soluble phosphates.

EDWARD S. YATES.

REFERENCES CITED

The following references are of record in the file of this patent:

UNITED STATES PATENTS

| Number | Name | Date |
|---|---|---|
| 1,736,747 | Morton | Nov. 19, 1929 |
| 2,267,290 | Somerville et al. | Dec. 23, 1941 |

OTHER REFERENCES

Chemical Abstracts, vol. 24, page 2806 (1930), abstracted from J. Pharmacol., vol. 38, pages 231–239 (1930).

Chemical Abstracts, vol. 33, page 7322 (1939), abstracted from Arch. Exptl. Path. Pharmakol., vol. 190, pages 341–344 (1938).

Chemical Abstracts, vol. 36, page 130 (1942), abstracted from Indian J. Med. Research, vol. 29, pages 71–82 (1941).